March 27, 1928.
C. C. JESSEN
1,663,555
SPINNING POT
Filed April 9 1927
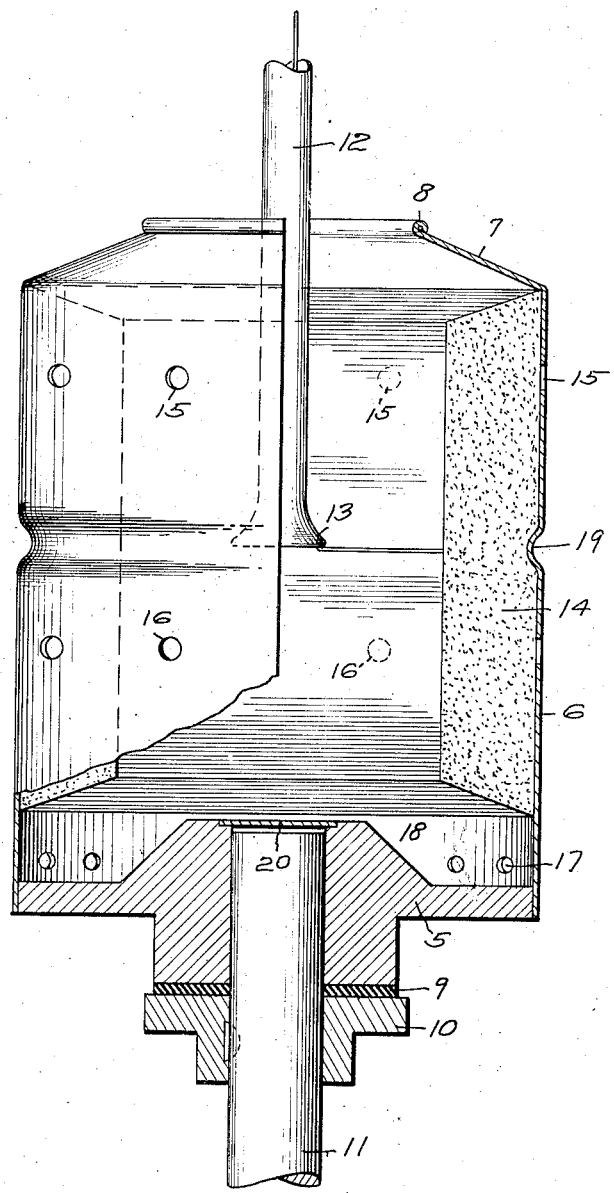
Inventor
Charles C. Jessen,
By Samuel Herrick,
Attorney Patented Mar. 27, 1928.

1,663,555

UNITED STATES PATENT OFFICE.

CHARLES C. JESSEN, OF CLIFTON, NEW JERSEY, ASSIGNOR TO NAPON RAYON CORPORATION, OF CLIFTON, NEW JERSEY, A CORPORATION OF DELAWARE.

SPINNING POT.

Application filed April 9, 1927. Serial No. 182,379.

This invention relates to spinning centrifuges or spinning pots, and more particularly to those used in the manufacture of artificial silk.

The nature of the invention and its advantages will be more readily understood by reference to the accompanying drawing which is a view, partly in elevation and partly in section, of a spinning centrifuge constructed in accordance with the invention.

In the particular embodiment of the invention which I have chosen for purposes of illustration, the spinning pot comprises a relatively heavy base 5 and a thin cylindrical shell 6. The upper end of the shell 6 is turned inwardly at 7 and is provided with a reenforcing bead 8. In operation the base of the pot rests upon a friction washer 9 of leather or other suitable material and this washer, in turn, bears upon a collar 10 that is keyed to the rotative drive shaft 11. This shaft may be driven in any suitable manner and is usually driven at a high rate of speed by an electric motor. However, it is to be understood that the method of driving the shaft 11 forms no part of the present invention.

In the usual and known use of pots of this character the threads from the spinnerets of artificial silk manufacturing machines are led downwardly through vertical guide tubes 12, having bell-shaped lower ends 13, into the rapidly whirling spinning pots where the thread is caught and built up into the form of a cake 14, upon the inner wall of the pot.

Some of the liquid of the precipitating bath is carried over by the threads and if means were not provided to get rid of it, enough of this liquid would collect in the pots to unbalance the same. Furthermore, it is necessary, in starting the threads to form the cakes, to wash the relatively tender threads through the guide tube 12 and it becomes necessary to get rid of the liquid used for this purpose, since the presence of liquid in the pot would unbalance and cause highly objectionable vibration of the same. Undue vibration of these pots results in increased noise, excessive wear and injury to the delicate threads. It is customary to provide openings in the pot for the escape of the liquid mentioned. However, it has been found that sometimes the cake itself moves to such position or is built up in such position, with respect to these openings, as to close them and prevent the escape of the liquid. Therefore it is the primary object of the present invention to bring about such a correlation of elements as will insure against the cake ever moving to a position where it will prevent the ready escape of the liquid mentioned. To achieve the foregoing object I provide the shell 6 with openings 15, 16 and 17, and I provide the base 5 with an upstanding boss 18, the top of which lies such a material distance above the level of the openings 17 that the guide tube 12 can never travel low enough to build the cake up in such position as to close said openings. In addition I provide the shell 6 with an internal rib 19 which is preferably formed by rolling the metal of the shell in its manufacture. This internal rib engages the cake in such manner as to prevent vertical movement of the cake within the pot and insures against the possibility of the cake ever moving downwardly, under the influence of gravity, to such a point as to close the openings 17.

In the usual operation of devices of this character, after the cake has been built up to a desired size, it becomes necessary to remove the cake, together with the pot in which it is contained, and to substitute an empty pot upon the shaft 11, so that the operation may be continued. At this time the attendant must lift the guide tube 12 entirely clear of the pot, and means are provided upon conventional machines of this character for rendering it possible to do this. Then, when the empty pot has been placed in position, the attendant must adjust the guide tube 12 to have the proper vertical travel in the spinning pot, it being understood that this guide tube reciprocates vertically as the pot whirls, so that the thread is laid evenly along the wall of the centrifuge. The openings 15 and 16 will take care of the flow of the precipitating bath which travels over with the thread during the spinning, and also will take care of the liquid (precipitating bath) used to wash the thread through the funnel 12 and into the pot, when starting a pot originally: If nothing happens to the thread during the spinning, i. e., if it does not break, and if it is unnecessary for any reason, to re-thread the pot before the cake, which it contains, is removed, the openings 17 are not needed. The function of the openings 17 is to relieve the pot of any sudden influx of liquid, such as we obtain if the pot is re-threaded while some cake covers the openings 15 and 16. Consequently the importance of keeping these openings unobstructed will be readily apparent. It will be seen that simple and efficient means have been devised for accomplishing this object, these means residing in the provision of the openings 17 at a very low point; the provision of the upstanding boss to limit the downward adjustment of the guide tube and to consequently limit the downward extension of the cake; and the provision of the internal rib 19 for locking the cake against accidental downward movement.

The particular manner of mounting the base upon the shaft 11 forms no part of the present invention. However, in the particular form shown, a small plate 20, making fluid tight contact with the boss 18, is used to cover the upper end of the shaft 11.

It is to be understood that the invention is not limited to the precise construction set forth but that it includes within its purview whatever changes fairly come within either the terms of the spirit of the appended claims.

Having described my invention what I claim is:

1. A centrifuge of the character described having liquid escape openings formed therein near the bottom, of means carried by the centrifuge for preventing the cake formed in said centrifuge from moving downwardly.

2. The combination with a centrifuge of the character described having a liquid escape opening formed therein at a point near the bottom and having a guide tube mounted for reciprocation therein, of means for preventing the downward adjustment of said guide tube to a point where the cake built up will obstruct said opening.

3. The combination with a spinning pot of the character described having liquid escape openings formed therein near the bottom thereof, of means for preventing the downward movement of the cake formed therein and means for limiting the downward adjustment of the guide tube thereof, to a point where the cake formed will lie wholly above said openings.

4. The combination with a pot of the character described having an internal circumferential rib to engage the cake formed therein, as and for the purposes stated.

5. The combination with a pot of the character described having liquid escape openings formed therein near the bottom, of an upstanding member carried by the base of said pot, which extends to a point materially above the level of said openings and prevents the formation of the cake at such a point as to obstruct said openings.

6. The combination with a pot of the character described having liquid escape openings formed therein near the bottom thereof, of an internal rib formed upon the wall of said pot for engaging the cake built up therein to prevent downward movement of said cake, and an upstanding boss carried by the base of said pot and serving to limit the downward movement of the guide tube to such a point that the cake built up by the action of said guide tube, will lie wholly above the level of said openings.

7. A centrifuge of the character described, having liquid escape openings formed therein near the bottom, and an inwardly directed projection upon the inner wall of the centrifuge, shaped to engage the cake formed in said centrifuge and prevent the same from moving downwardly.

In testimony whereof he affixes his signature.

CHARLES C. JESSEN.